US011818662B2

(12) United States Patent
Sanaullah et al.

(10) Patent No.: US 11,818,662 B2
(45) Date of Patent: Nov. 14, 2023

(54) ENERGY SAVINGS SYSTEM BASED MACHINE LEARNING OF WIRELESS PERFORMANCE ACTIVITY FOR MOBILE INFORMATION HANDLING SYSTEM CONNECTED TO PLURAL WIRELESS NETWORKS

(71) Applicant: Dell Products, LP, Round Rock, TX (US)

(72) Inventors: Abu S. Sanaullah, Austin, TX (US); Liam B. Quinn, Austin, TX (US); Jace W. Files, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/902,984

(22) Filed: Sep. 5, 2022

(65) Prior Publication Data

US 2022/0417861 A1 Dec. 29, 2022

Related U.S. Application Data

(62) Division of application No. 16/779,476, filed on Jan. 31, 2020, now Pat. No. 11,438,841.

(51) Int. Cl.
*H04W 28/02* (2009.01)
*H04W 52/02* (2009.01)
*G06N 20/00* (2019.01)

(52) U.S. Cl.
CPC ........ *H04W 52/0258* (2013.01); *G06N 20/00* (2019.01); *H04W 52/0254* (2013.01); *H04W 52/0274* (2013.01)

(58) Field of Classification Search
None
See application file for complete search history.

(56) References Cited

U.S. PATENT DOCUMENTS

| 2003/0222819 A1* | 12/2003 | Karr | G01S 5/021 |
| | | | 342/457 |
| 2004/0204032 A1* | 10/2004 | Hisano | H04W 76/50 |
| | | | 455/552.1 |

(Continued)

*Primary Examiner* — Sai Aung
(74) *Attorney, Agent, or Firm* — Prol Intellectual Property Law, PLLC; H. Kenneth Prol

(57) ABSTRACT

A mobile information handling system comprising a plurality of wireless network interface modules, a wireless network interface control system for controlling the plurality of wireless network interface modules, and a processor executing instructions of a wireless utilization machine learning inference modulator to receive iterative wireless utilization profiles indicating aggregated time and location profiles of wireless network utilization parameters and user configuration states of the information handling system for data needs including applications and hardware usage levels. The system to execute a machine learning process to determine a predictive time and date based plural wireless control setting index for adjusting control settings of the plural wireless network interface modules based on the received iterative wireless utilization profiles and to modify operation of some the plurality of wireless network interface modules based on the predictive time and date based plural wireless control setting index for an impending predictive time period.

20 Claims, 5 Drawing Sheets

(56) References Cited

U.S. PATENT DOCUMENTS

| | | | |
|---|---|---|---|
| 2013/0002675 A1* | 1/2013 | Hicks | H04W 24/08 345/440 |
| 2013/0042008 A1* | 2/2013 | Das | G06F 16/9537 709/226 |
| 2015/0223071 A1* | 8/2015 | Raleigh | H04L 63/08 726/1 |
| 2015/0244751 A1* | 8/2015 | Lee | H04L 65/80 709/219 |
| 2018/0284758 A1 | 10/2018 | Cella | |
| 2019/0064791 A1 | 2/2019 | Cella | |
| 2019/0324439 A1 | 10/2019 | Cella | |
| 2019/0324444 A1 | 10/2019 | Cella | |
| 2020/0266910 A1 | 8/2020 | O'Shea | |

\* cited by examiner

ENERGY SAVINGS SYSTEM BASED MACHINE LEARNING OF WIRELESS PERFORMANCE ACTIVITY FOR MOBILE INFORMATION HANDLING SYSTEM CONNECTED TO PLURAL WIRELESS NETWORKS

FIELD OF THE DISCLOSURE

The present disclosure generally relates mobile information handling system operating on plural wireless networks. The present disclosure more specifically relates to machine learning determination of wireless performance activity based on device usage, states of wireless activity, historical activity, sensor data, and states of the mobile information handling system determined through machine learning techniques.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include wireless communication such as via various types of protocols as described. With plural wireless networks operating, energy usage may increase impacting battery life for mobile information handling systems.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
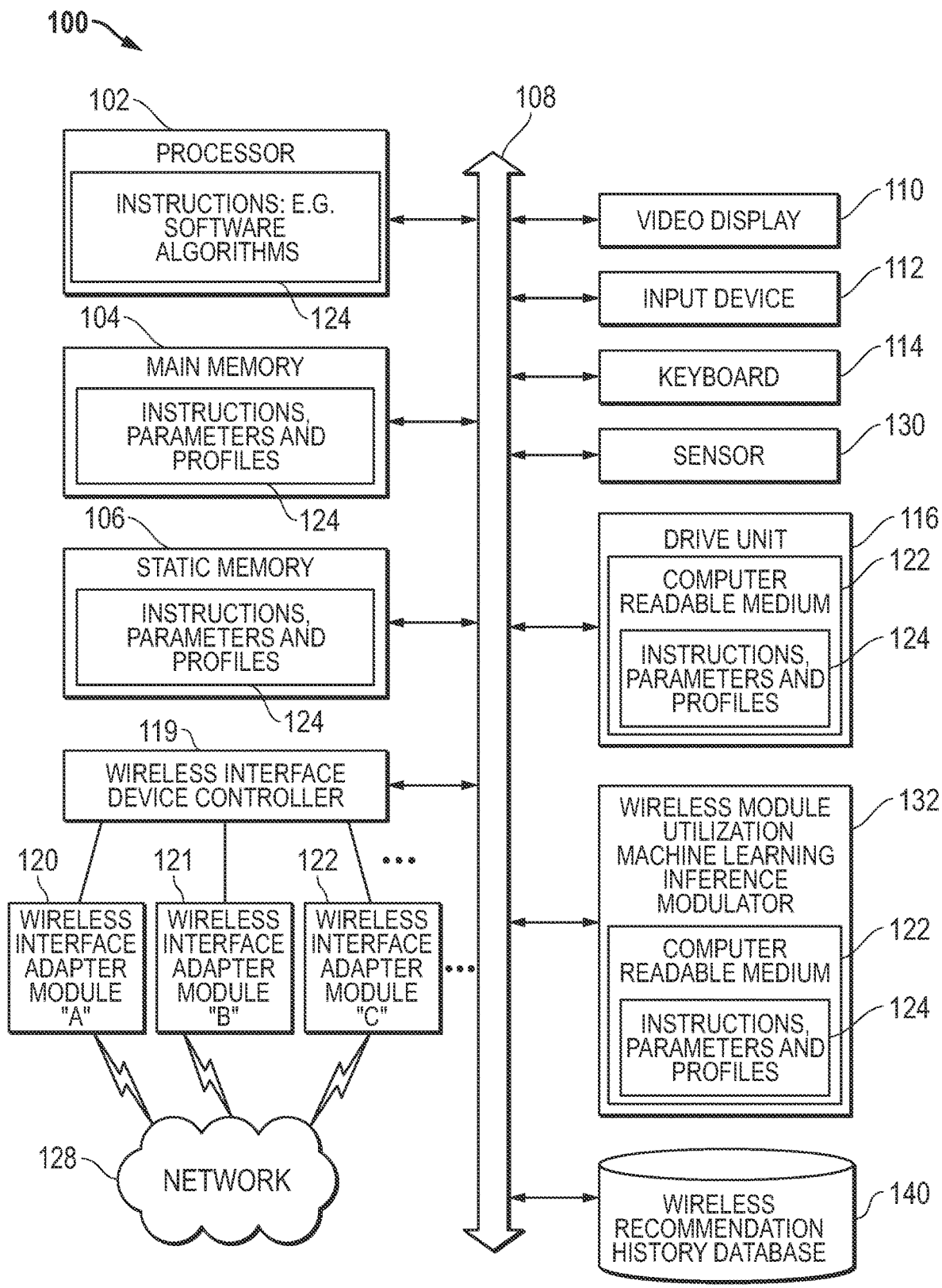
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In some examples, mobile information handling systems at present may statically select access points, roam only when the mobile information handling system detects poor wireless performance, and select certain channels that have relatively higher signal strength. This results in less than optimal wireless performance by these mobile information handling systems. While the simplest solution to this need may involve the addition of multiple transceiving (i.e., transmitting and receiving) antennas within the mobile information handling system, with each antenna dedicated to a single type of signal, this solution conflicts with a competing goal of rendering the mobile information handling system slim, lightweight, and energy efficient.

Embodiments of the present disclosure provide for a mobile information handling system that accounts for iterative wireless utilization profiles that include aggregated profiles of daily wireless network utilization parameters of the performance of a plurality wireless network interface modules available on the mobile information handling system as well as aggregation of user configuration states for data needs on the same daily timeline. The aggregated iterative wireless profiles may be utilized by a wireless utilization machine learning inference modulator to determine a time and date based plural wireless control settings index for the plurality of available wireless network interface modules. These aggregated iterative wireless profiles may be assessed by the wireless utilization machine learning inference modulator in example embodiments for an enterprise user, or other users, on a daily basis and over the course of each day due to regularity of schedules, through predictability via calendaring and locations, and due to recognized trends of wirelessly activity that may occur in a plurality of yearly, monthly, weekly, daily, hourly, or according to other time-repeated rhythms. Further, the wireless utilization machine learning inference modulator may apply a machine learning classifier to determine patterns of wireless network interface usage as well repetition of patterns relating to location, movement, application usage, and device characteristics relating to processor usage, port usage including wired network access, battery usage, and other hardware component usage. These aspects relate to changing user configuration states for data needs that may change throughout time-repeated rhythms or may be altered otherwise.

The wireless utilization machine learning inference modulator may implement a machine learning system to take in several wireless function attributes and user configuration states for data needs at any given set of time, day of the week, calendar date, calendar schedule, or location to determine a time and date based plural wireless control setting index. This time and date based plural wireless control setting index may be used to update the previously-determined predictive time and date based plural wireless control setting index in a wireless recommendation history database by the wireless utilization machine learning inference modulator. The wireless utilization machine learning inference modulator may have an associated wireless recommendation history database. In some aspects of the present disclosure, the wireless utilization machine learning inference modulator may access the stored history of previously-determined predictive time and date based plural wireless control setting indices for a baseline of initial inputs into the machine learning inference system if any correlate with the present operation circumstances. Then the wireless utilization machine learning inference modulator may include the received iterative wireless utilization profiles aggregated for wireless attributes and the changes to user configuration states for data needs for categorization with a predictive time and date based plural wireless control setting index entry.

Based on the updated predictive time and date based plural wireless control setting index, a network interface control module may adjust the performance of the one or more wireless network interface modules knowing which wireless interface modules are needed in a predicted future time period. The settings retrieved from the wireless recommendation history database may serve as a predictive recommendation index of time and date based plural wireless control settings. For example, the network interface control module may opportunistically enable or disable any of the plurality of wireless network interface modules given the predicted recommendation index of time and date based plural wireless control settings.

The mobile information handling system and method described herein may allow for a dynamic adjustment of the plurality of wireless network interface modules actively used to attempt to communicatively couple the mobile information handling system to plural wireless networks. Predictive adjustments in the number of active plurality of wireless network interface modules transmission power may dynamically conserve energy and increase communicative abilities between the mobile information handling system and the anticipated wireless network or wireless networks scheduled to be active according to the updated predictive time and date based plural wireless control setting index tored in a wireless recommendation history database for use by the wireless network interface controller. In that way, the wireless network interface controller may provide for an automatic wireless settings environment so that the user may initiate communication via a wirelessly networked device while decreasing the power consumption of the mobile information handling system during downtime of wireless interface modules and other resources anticipated to not be used according to the predictive adjustments.

As mobile computing infrastructure evolves worldwide to enable mobile information handling systems to transmit and receive larger amounts of data more quickly and easily while on the move, the abilities of these mobile information handling systems to receive and transmit various signals increase demands on the mobile information handling systems. A greater number of wireless adapter modules and antenna systems for communicating with multiple wireless protocols may be deployed on mobile information handling system. Further, with the advent of 5G technologies, multiple high-bandwidth, high frequency antenna systems and wireless network front end modules may be deployed, including deployment of systems to conduct beamsteering for 5G technologies as well as initiation routine scans for available wireless access points in one or more wireless protocols. Activity by these wireless network interface modules consume large amounts of energy. Thus, while wireless performance of any given mobile information handling system may tax power usage, thus predictive adjustments are beneficial to power and battery conservation measures. Further, utilization of local, system level resources within the mobile information handling system for the wireless utilization machine learning inference modulator, machine learning system operation, and wireless recommendation history database may consume substantial resources. Therefore, some portion or all of these activities maybe off loaded from the mobile information handling system and a predictive recommendation index of time and date based plural wireless control settings may be received in some embodiments to dynamically adjust wireless network interface performances.

FIG. 1 illustrates a mobile information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, a mobile information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices, such as a keyboard, a mouse, a video/graphic display, or any combination thereof. The information handling system 100 can also include one or more buses operable to transmit communications between the various hardware components. Portions of an information handling system 100 may themselves be considered information handling systems 100.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 may include memory such as main memory 104, static memory 106, computer readable medium 122 storing instructions 124 of a wireless utilization machine learning inference modulator 132, a wireless recommendation history database 140, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, a solid-state display, or a cathode ray tube (CRT). Additionally, the information handling system 100 may include an input device 112, such as a cursor control device (e.g., mouse, touchpad, or gesture or touch screen input, and a keyboard 114. The information handling system 100 can also include a disk drive unit 116.

The network interface device controller 119 may be operably connected to coordinate performance and enablement of a plurality of network interface modules including wireless network interface modules 120, 121, 122, and any additional wireless network interface modules deployed with the information handling system 100. Wireless network interface modules 120, 121, 122, and any additional wireless network interface modules shown can provide connectivity to a network 128, e.g., a wide area network (WAN), a local area network (LAN), wireless local area network (WLAN), a wireless personal area network (WPAN), a wireless wide area network (WWAN), or other networks. Connectivity may be via wired or wireless connection. The network interface device 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one network interface device may operate two or more wireless network interface modules 120, 121, 122, and any additional wireless network interface modules or wireless network interface modules 120, 121, 122, and any additional wireless network interface modules may be distinct wireless network interface devices.

Wireless network interface modules 120, 121, 122, and any additional wireless network interface modules may connect to any combination of macro-cellular wireless connections including 2G, 2.5G, 3G, 4G, 5G or the like from one or more service providers as well. Utilization of radiofrequency communication bands according to several example embodiments of the present disclosure may include bands used with the WLAN standards and WWAN carriers, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. Additionally, With the advent of 5G networks, any number of protocols may be implemented including global system for mobile communications (GSM) protocols, general packet radio service (GPRS) protocols, enhanced data rates for GSM evolution (EDGE) protocols, code-division multiple access (CDMA) protocols, universal mobile telecommunications system (UMTS) protocols, long term evolution (LTE) protocols, long term evolution advanced (LTE-A) protocols, WiMAX, LTE, and LTE Advanced, LTE-LAA, small cell WWAN and IP multimedia core network subsystem (IMS) protocols, for example, and any other communications protocols suitable for the method(s), system(s) and device(s) described herein, including any proprietary protocols. The protocols implemented may operate on certain 5G frequencies such as high frequency (HF) bands, very high frequency (VHF) bands, ultra-high frequency (UHF) bands, L band, S band, C band, X band, Ku band, K band, Ka band, V band, W band, and millimeter wave bands, among others.

In some embodiments, software, firmware, dedicated hardware implementations such as application specific integrated circuits (ASICs), programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system such as processor 102 described herein. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 can communicate voice, video or data over the network 128. Further, the instructions 124 may be transmitted or received over the network 128 via the wireless network interface modules 120, 121, 122, and any additional wireless network interface modules.

The information handling system 100 can include a set of instructions 124 that can be executed to cause the computer system to perform any one or more of the methods or computer-based functions disclosed herein. For example, instructions 124 may execute a wireless utilization machine learning inference modulator 132, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116 and the wireless utilization machine learning inference modulator 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 may also contain space for data storage. Further, the instructions 124 may embody one or more of the methods or logic as described herein. For example, instructions relating to the wireless utilization machine learning inference modulator 132 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of wireless utilization machine learning inference modulator 132 may be executed locally or remotely. The main memory 104 and the processor 102 also may include computer-readable media. In a particular embodiment, the instructions, parameters, and profiles 124 for the wireless utilization machine learning inference modulator 132 operations to determine predictive adjustments to wireless network interface modules 120, 121, 122, and any additional wireless network interface modules to may reside completely, or at least partially, within the main memory 104, the static memory 106, a wireless recommendation history database 140, and/or within the disk drive 116. In some embodiments, some or all of the wireless utilization machine learning inference modulator 132 operations or the wireless recommendation history database 140 may reside on the mobile information handling system receiving predictive adjustments to wireless network interface modules 120, 121, or 122, or on one or more remotely connected information handing system.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The wireless utilization machine learning inference modulator 132 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the wireless utilization machine learning inference modulator 132 that may be operably connected to the bus 108. The wireless utilization machine learning inference modulator 132 computer readable medium 122 may also contain space for data storage such as the wireless recommendation history database 140. The wireless utilization machine learning inference modulator 132 may, according to the present description, perform tasks related to receiving at the wireless utilization machine learning inference modulator 132, from one or more sensors 130 and the processors 102 including CPUs and GPUs, data descriptive of wireless utilization profiles and user configuration states for data needs of the mobile information handling system 100. Data descriptive of wireless utilization profiles and user configuration states for data needs may include movement of the mobile information handling system 100, human presence the mobile information handling system 100, time of day from a system clock, day of the week, locations from location sensors, movement from orientation sensor, calendars of a user activity, software usage activity and device characteristics relating to component hardware operation such as CPU utilization, GPU utilization, port usage, energy consumption and the like. This data may be used by the wireless utilization machine learning inference modulator 132 in determining, based on the data, the predictive time and date based plural wireless control setting indices for the mobile information handling system 100; and, based on the same, predictively adjusting the performance of the wireless network interface modules such as 120, 121, or 122. This may include predictively enabling or disabling on one or more wireless network interface modules.

In an embodiment, the wireless utilization machine learning inference modulator 132 may communicate with the main memory 104, the processor 102, the video display 110, the alpha-numeric input device 112, and the network interface device controller 119 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

In other embodiments, dedicated hardware implementations such as ASICs, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
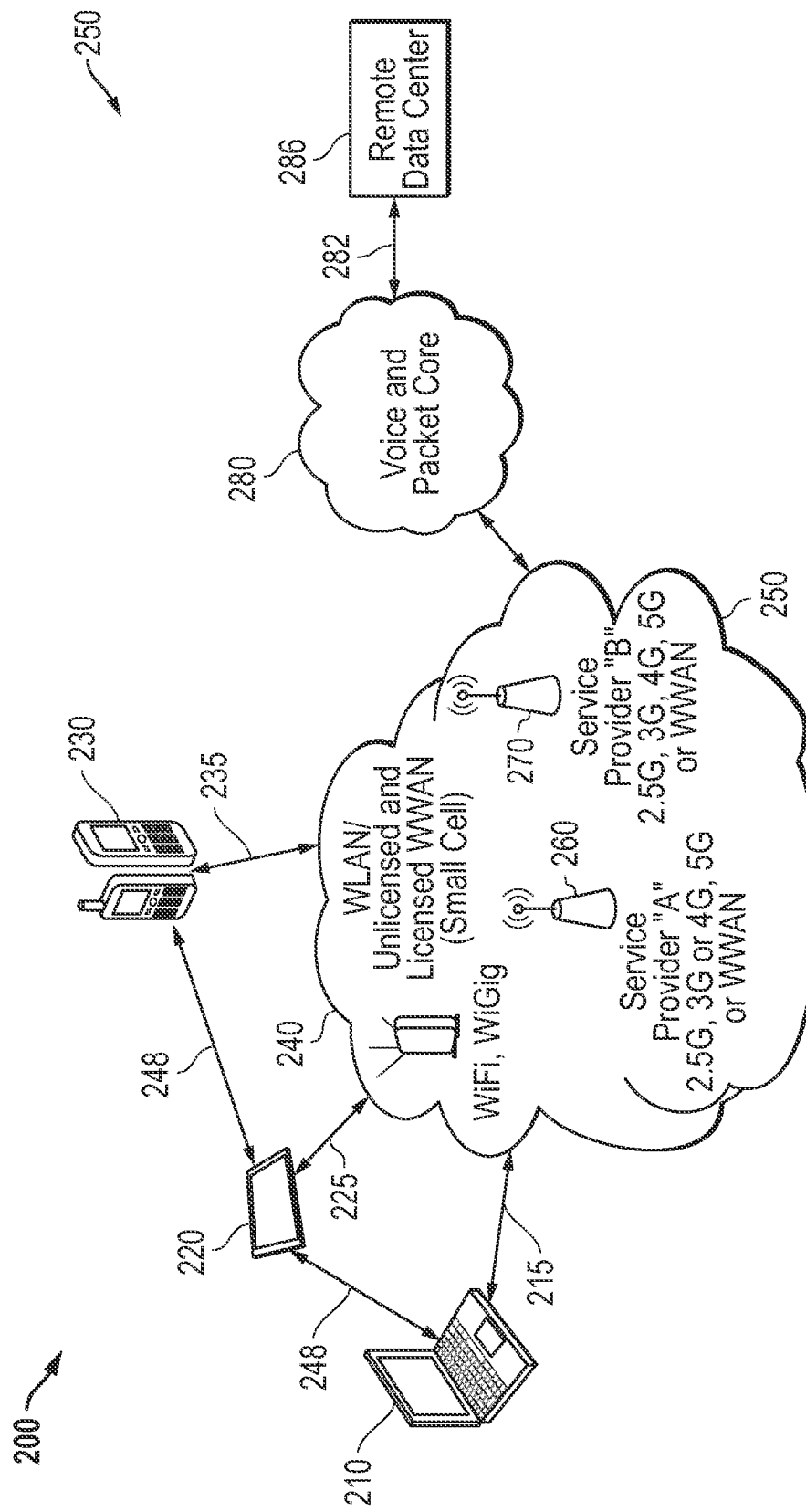
FIG. 2 is a block diagram of a network environment offering several communication protocol options for mobile information handling systems according to an embodiment of the present disclosure.

FIG. 2 illustrates a network 200 that can include one or more information handling systems 210, 220, 230. In a particular embodiment, network 200 includes networked mobile information handling systems 210, 220, and 230, wireless network access points, and multiple wireless connection link options. A variety of additional computing resources of network 200 may include client mobile information handling systems, data processing servers, network storage devices, local and wide area networks, or other resources as needed or desired. As partially depicted, systems 210, 220, and 230 may be a laptop computer, tablet computer, 360-degree convertible systems, wearable computing devices, or a smart phone device. These mobile information handling systems 210, 220, and 230, may access a wireless local network 240, or they may access a macrocellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11, IEEE 1914/1904, IEEE P2413/1471/42010, or 5G small cell WWAN communications such as eNodeB, or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or 5G standards including GSM, GPRS, EDGE, UMTS, IMS, WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands that may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology such as high frequency (HF) band, very high frequency (VHF) band, ultra-high frequency (VHF) band, L band, S band, C band, X band, Ku band, K band, Ka band, V band, W band, and millimeter wave bands. This may create situations where a plurality of antenna systems are operating on a mobile information handling system 210, 220 or 230 via concurrent communication wireless links on both WLAN and WWAN and which may operate within the same, adjacent, or otherwise interfering communication frequency bands. Further, multiple wireless network interface modules may be operating to establish wireless links when not all wireless links may be used. The antenna may be a transmitting antenna that includes high-band, medium-band, low-band, and unlicensed band transmitting antennas. Alternatively, embodiments may include a single transceiving antennas capable of receiving and transmitting, and/or more than one transceiving antennas. Each of the antennas included in the information handling system 100 in an embodiment may be subject to the FCC regulations on specific absorption rate (SAR). The antenna in the embodiments described herein is an aperture antenna (i.e., a cavity-backed dynamic tunable aperture antenna system) intended for efficient use of space within a metal chassis of an information handling system. Aperture antennas in embodiments of the present disclosure may be an effective improvement on wireless antennas employed in previous information handling systems.

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers may include web servers or resources within a cloud environment that operate via the voice and packet core 280 or other wider internet connectivity. For example, remote data centers can include additional information handling systems, data processing servers, network storage devices, local and wide area networks, or other resources as needed or desired. In some example embodiments some or all of the wireless utilization machine learning modulator system or the wireless recommendation history database. Having such remote capabilities may permit fewer resources to be maintained at the mobile information handling systems 210, 220, and 230 allowing streamlining and efficiency within those devices. Similarly, remote data center permits fewer resources to be maintained in other parts of network 200.

Although 215, 225, and 235 are shown connecting wireless network interface modules of mobile information handling systems 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as an access point or even potentially an WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access points including other mobile information handling systems as illustrated in FIG. 2.

Figure 3:
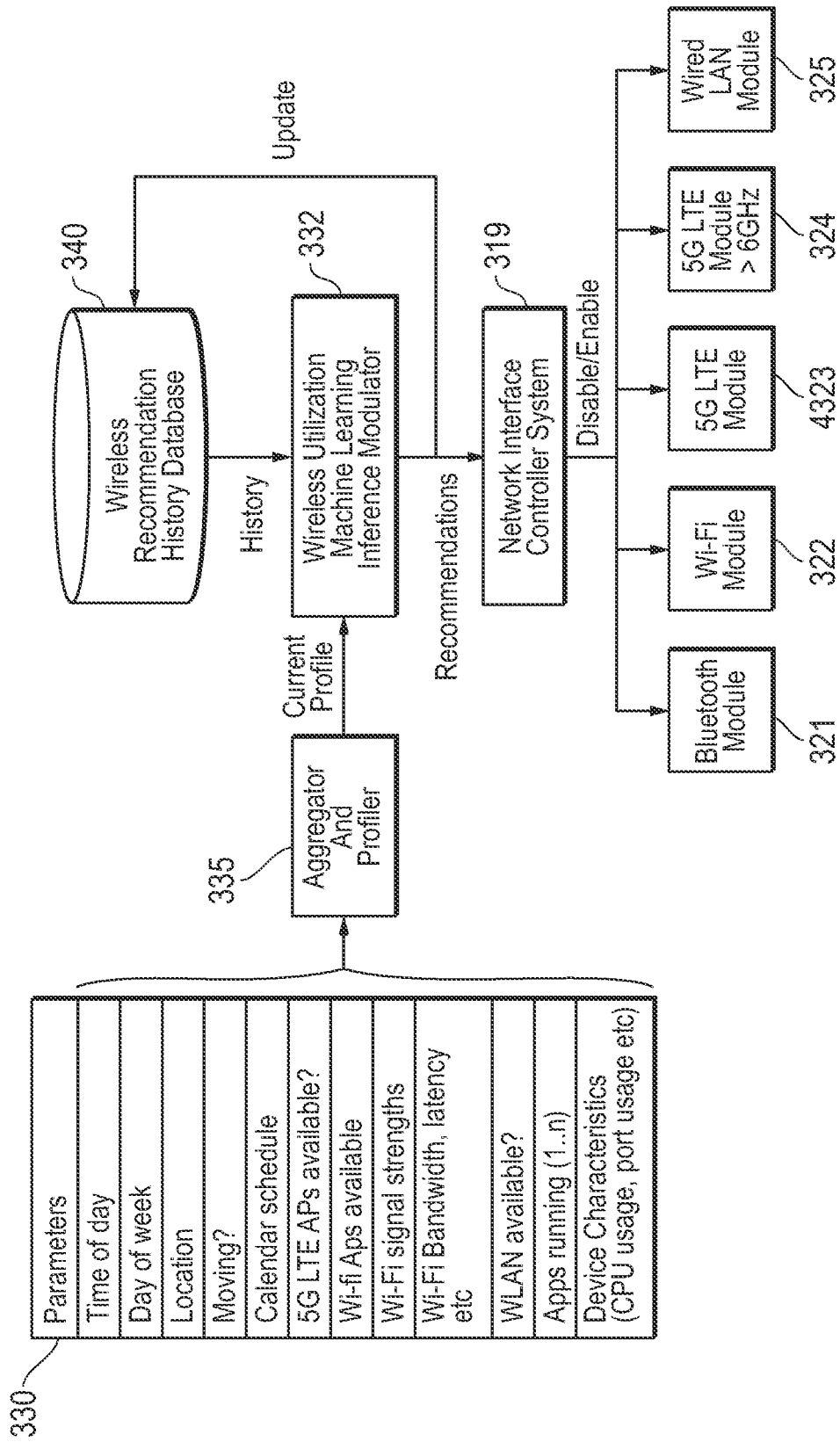
FIG. 3 is a block diagram of a wireless utilization machine learning inference modulator for a mobile information handling system according to an embodiment of the present disclosure.

FIG. 3 depicts a block diagram of a wireless utilization machine learning inference modulator and network interface control system for providing learned, predictive control adjustment to settings for multiple wireless network interface modules that may be deployed on an information handling system. In order to conduct the processes and methods described herein, an information handling system may include hardware, software, firmware of a combination thereof. For example, the wireless utilization machine learning inference modulator 332 and aggregator and profiler system 335 may be code instructions executable on a processor. In another example, the network interface control system 319 may operate on one or more controllers of a network interface device, or may partially operate on a processor to issue controls to adjust settings or operation of the plurality of wireless network interface device modules such as 321, 322, 323, 324 and 325. Further, the wireless recommendation history database may be implemented on a static memory drive, disk drive, or other memory as described herein. In yet other embodiments, any of the above aspects may be implemented wholly or partially in remote computing and storage environments as discussed in embodiments herein.

The system of embodiments herein may include a wireless utilization machine learning inference modulator 332 for utilization of one or more machine learning processes to improve power usage efficiency by controlling or limiting operation of portions of the plural wireless network interface modules that may or may not be operating on a mobile information handling system. In current mobile information handling systems, and with the advent of high-bandwidth function of 5G protocols to transmit high volumes of data wireless to enable greater functionality of mobile information handling systems, a plurality of wireless network interface modules 321, 322, 323, 324, and 325 or more modules may be deployed and operational on mobile information handling systems. These may include one or more Bluetooth® wireless network interface modules 321, one or more Wi-Fi wireless network interface module 322, one or more 5G sub-6 GHz wireless network interface modules 323, one or more 5G above-6 GHz wireless network interface modules 324, and a wired LAN module 325. Additionally, other LTE cellular modules may be deployed on a mobile information handling system such as 2G, 2.5G, 3G, or 4G wireless network interface modules (not shown). In another aspect, other wireless network interface modules may be deployed on mobile information handling system modules such as near field communication modules, GNSS wireless modules, or other wireless network interface modules such as used with IoT wireless protocols or the like.

The plurality of wireless network interface modules 321, 322, 323, 324, and 325 may receive instructions setting operation parameters of each wireless network interface module from a network interface controller 319. An index of settings for the plurality of wireless network interface modules 321, 322, 323, 324, and 325 may be determined by the wireless utilization machine learning inference modulator 332 as a predictive time and date based plural wireless control setting index generated according to embodiments described herein. The predictive time and date based plural wireless control setting index may be generated, or accessed from a wireless recommendation history database, for a particular time and date based set of identified patterns to apply optimal plural wireless network interface module settings for a predictive time period of wireless utilization and user configuration states for data needs to improve energy usage efficiencies.

In another aspect of FIG. 3, a profile aggregator 335 may collect and aggregate data for a series of parameters 330 relevant to the wireless utilization of an information handling system. This data may be an aggregation for parameters 330 which indicate which wireless network protocols are available for data communications, such as whether one or more 5G LTE access points, Wi-Fi access points, or a wired network connection are available in an iterative wireless utilization profile. Further, parameter data may be collected as to whether other wireless network protocols are available or activated. Additional wireless utilization parameters may include bandwidth, latency, signal strength levels, interference levels, and other metrics detected by the wireless network interface modules for connections on wireless network protocol wireless links or test measurements according to some embodiments. These wireless utilization parameters may form part of the aggregated data to generate an iterative wireless utilization profile that may be measured and generated periodically or continuously monitored.

Further, parameters relating to time, date, and schedule factors, as well as parameters related to location, movement, and other environmental sensors of the physical environment of the information handling system may be detected among the parameters 330 reported and aggregated by the profile aggregator 335. These time and date based or location based parameters may similarly be included in the aggregated parameters 330 for an iterative wireless utilization profile in some embodiments. Such data for these time and date related parameters may be collected for system clocks, a system calendar that may operate on an operating system, a user's calendar schedule in some aspects of embodiments herein. Location, movement, and physical environment data for related parameters that may also be part of the iterative wireless utilization profile in some embodiments. These location, movement, and physical environment data for parameters aggregated in some embodiments by the profile aggregator 335 may be collected by a plurality of sensors such as location sensors such as GPS and others according to embodiments herein, motion sensors such as accelerometers, gyroscope, and orientation sensors or others according to embodiments herein, and other physical environment sensors as described herein.

Additionally, parameters relating to user configuration states for data needs may be measured and aggregated by the profile aggregator 335. For example, an operating system or BIOS may indicate what software applications are operating and what type of data operations and data network connection needs may be required by usage of those applications. Information relating to operating software applications may be reported by an operating system (OS), basic input/output system (BIOS), or may be tracked by a system such as that for Dell's® Datavault system or other OS dashboard systems collecting information on system health, performance, and environment of software applications or similar systems. Further, parameters relating to user configuration states for data needs may relate to operation of system hardware such as CPU usage, GPU usage, memory usage levels, port usage levels, and other hardware system assessments which may relate to data needs and network connectivity. These parameters, such as the above examples, relating to user configuration states for data needs may be also aggregated by the profile aggregator 335 for inclusion in the iterative wireless utilization profile that may be delivered to the wireless utilization machine learning inference modulator 332

In some embodiments, any combination of any portion of the above described parameters 330 may be actively aggregated by the profile aggregator 335. Further, any combination of parameters 330 as described according to various embodiments herein may be included in the iterative wireless utilization profile at any given iteration that may be used by the wireless utilization machine learning inference modulator 332 according to embodiments herein. Further, some or all of the parameters 330 may not be available or relevant in embodiments herein.

The wireless utilization machine learning inference modulator 332 receives the iterative wireless utilization profile from the profile aggregator 335. The iterative utilization profile may include wireless network utilization parameters of the performance of the plural wireless network interface modules as well as current iteration user configuration states for data needs. The wireless utilization machine learning inference modulator 332 will cross reference the current time of day and date with the wireless recommendation history database 340 to whether those time and date parameters fall within a matching correlation threshold of a previously-determined predictive time and date based plural wireless control setting index entry. The time and date matching threshold may involve a variety of factors to correlate the current time and date of an iterative wireless utilization profile with identified patterns of wireless utilization identified by machine learning that may follow patterns in times of day, days of the week, days of the month, days of the year, or other variations such as proximity to holidays or scheduled events or vacations discerned from calendar entries. A correlation with categorization of those patterns in time and date may include a threshold where a minimum subset of correlating time and date factors match according to machine learning categorization application. Further classification factors may include locations detected, motion, or software applications currently operating to correlate the iterative wireless profile at the current time and day with a previously-determined predictive time and date based plural wireless control setting index entry in some embodiments.

If a previously-determined predictive time and date based plural wireless control setting index entry has a correlation value meeting a pattern found in the current time and date, or additional factors, of the received iterative wireless utilization profile, the identified previously-determined predictive time and date based plural wireless control setting index entry may be retrieved from the wireless recommendation history database 340. The wireless utilization machine learning inference modulator 332 will utilize the settings of the identified previously-determined predictive time and date based plural wireless control setting index entry as a baseline for use with the currently received iterative wireless utilization profile to assess settings of the plural wireless network interface modules for predictive adjustment. As the identified previously-determined predictive time and date based plural wireless control setting index entries are merged via the machine learning service of the wireless utilization machine learning inference modulator 332, the accuracy of the multi-factor categorization becomes more accurate and potentially more specific. Training of a machine learning model for one or more predictive time and date based plural wireless control setting index entries may be conducted via multiple iterations of the iterative wireless utilization profiles that match a correlation to a pattern found in the current time and date, or additional factors, of potential predictive time periods of wireless utilization by the mobile information handling system. In some aspects, a supervised machine learning algorithm may be utilized to predict desired outcome of disabling one or more wireless network interface modules or predict that one or more wireless network interface modules will be active while others are not. The supervised machine learning algorithm may initially operate within training period, and upon hitting a level of accuracy then be implemented to provide predictive setting adjustments. Other examples of machine learning service algorithms may be utilized as well including use of artificial neural networks, Bayesian networks, decision trees, regression analysis, among others that may be used to model the supervised machine learning operations.

The wireless utilization machine learning inference modulator 332 will apply a multi-factor categorization machine learning algorithm with multiple outputs to the set of baseline parameters of the previously-determined predictive time and date based plural wireless control setting index entry as well as the multiple current factors of the received iterative wireless utilization profile. The multi-factor categorization machine learning algorithm with multiple outputs may yield conclusions for performance setting of the plural wireless network interface modules. In other embodiments, a binary classifier may be used several times with each of the plural wireless network interface modules to predict binary states such as enable or disable states.

Once the wireless utilization machine learning 332 inference modulator applies a machine learning methodology to determine correlations of the influencing factors including time, day, date as well as the location, operating software applications, and hardware usage parameters in embodiments described herein, the wireless utilization machine learning inference modulator 332 may detect changes to any of these influencing factors from the iterative wireless utilization profiles it may either suggest or automatically apply changes to one or more of the factors controlling the settings for the plurality of wireless network interface modules. In some aspects, suggested predictive adjustments or notice of automatic predictive adjustments may be confirmed or declined by the user and this decision may be recorded for the predictive time and date based plural wireless control setting index entry for a correlated, matching time and date based pattern.

By modeling and profiling the previous historical behavior related to wireless systems utilization and in view of the various parameters 330, the wireless utilization machine learning inference modulator 332 can learn and infer in future impending predictive time periods which interfaces need to be disabled or otherwise modified because they are not used in the context of the pattern found in the current time and date, or additional factors, of the impeding predictive time period. Providing a matched correlation to machine learned wireless utilization time and date factor, or other factor, patterns enables determination of historical behavior control settings for the plurality of wireless network interface modules via predictive time and date based plural wireless control setting index entry. In one example embodiment, the wireless utilization machine learning inference modulator 332 in embodiments described herein may detect the user has a Monday morning 8 am recurring meeting, perhaps in a particular conference room, that involves execution of a particular business integration dashboard application. Further, that business integration application is always given priority and connected to 5G access points available in the identified location. As a result, the predictive time and date based plural wireless control setting index entry may recommend opportunistically disabling other interfaces, such as 4G LTE wireless network interface module or a Wi-Fi network interface module.

In another example embodiment, the wireless utilization machine learning inference modulator 332 in embodiments described herein may detect the user has scheduled travel and is located not at a home or office location or is located at an airport during a time and date of an impending wireless utilization time period, Wi-Fi may be difficult to access at an airport or during vehicle travel, but not during a flight, and a presentation development application and an email or IM system is frequently active. Accordingly, the system may determine that when travelling at an airport or in another vehicle, priority is given to service provider 4G LTE and 5G LTE wireless network interface modules available in the identified location or identified movement, and a Wi-Fi wireless network interface module is unlikely to be used. If during a predictive time period, the active travel is on an airplane the opposite may be true and Wi-Fi wireless network interface module may be active while 4G LTE and 5G LTE wireless network interface modules may be unavailable. As a result, the predictive time and date based plural wireless control setting index entry may recommend opportunistically disabling and enabling interfaces, such as 5G wireless network interface modules, a 4G LTE wireless network interface module or a Wi-Fi network interface module over the course of a predictive time period of wireless utilization by the user of the mobile information handling system.

Figure 4:
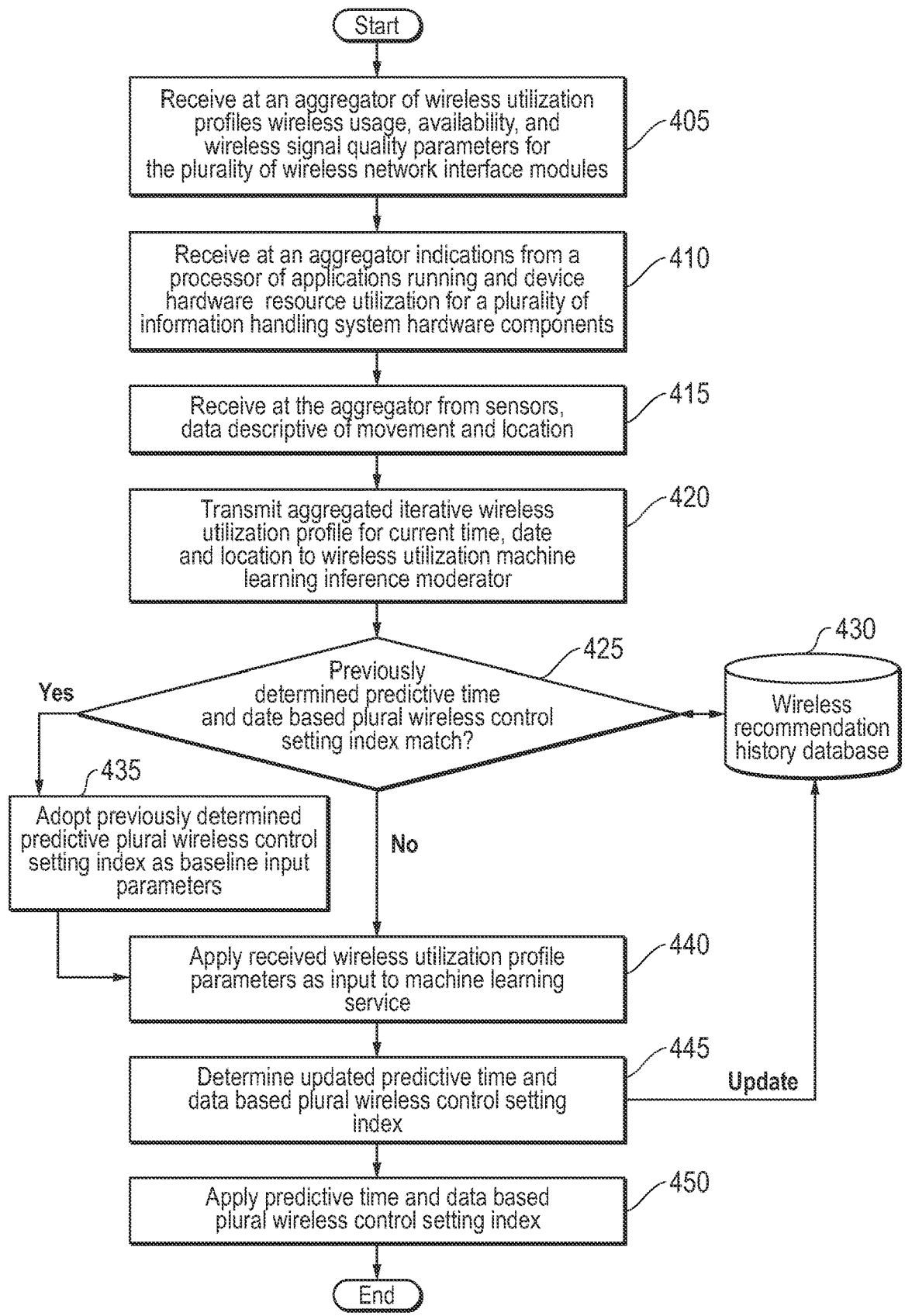
FIG. 4 is a flow diagram illustrating a method of dynamically or iteratively modulating a performance of a plurality of wireless network interface modules via machine learning for a mobile information handling system according to an embodiment of the present disclosure.

FIG. 4 is a flow diagram illustrating a method of dynamically or iteratively modulating a performance of a plurality of wireless network interface modules for a mobile information handling system according to an embodiment of the present disclosure. The method may begin at block 405, receiving at an aggregator for iterative wireless utilization profiles, parameters of wireless utilization, time, date and schedule factors, operating software applications, and hardware component utilization parameters for a particular iteration of assessment that may correspond to a category of predictive time period based on identified time and date based factors potentially including schedule factors, and in some embodiments other factors, for a wireless utilization settings index. Data for multiple parameters for the iterative wireless utilization profiles may be provided from a plurality of sources. A network interface control system or control systems on the wireless network interface modules may detect current wireless activity including access points currently available for each protocol associated with the plurality of wireless network interface modules on the mobile information handling system. Additional wireless utilization datapoints that may be reported by the network interface control system or control systems of the wireless network interface modules may include wireless bandwidth, wireless latency, wireless signal strength, and wireless interference measurements for the wireless network interface modules that are active at the time of detection for the iterative wireless utilization profile aggregation. Data sources time and date based factors may also include time, date, and schedule data from the system clock, system calendar, and user's calendar schedule as well as location factors, movement factors, and other factors from measured parameters in embodiments herein.

Proceeding to block 410, the information handling system, such as dashboard systems in BIOS or operating on the processor, may report information of the information handling system operations relating to currently operating software applications as well as reporting of hardware utilization levels. For example, a system, such as an OS dashboard or Dell® Datavault, may report what applications are currently running as well as CPU utilization, GPU utilization, memory utilization, battery or power states, and port activity among other factors. This information may relate to reporting on user configuration states for data needs based on utilization by the user of the information handling system software and hardware resources. This user configuration state for data needs is relevant to wireless network bandwidth needs as well as type of wireless network that may be needed by the information handling system. This is particularly true when aggregated with the wireless utilization parameters and proficiency of wireless operation for use in the wireless utilization machine learning inference modulator.

At block 415, further data sources for parameters delivered to the aggregator for iterative wireless utilization profiles may include sensors with data descriptive of location or movement of the mobile information handling system. Sensors may include location sensors such as GPS/GNSS systems, known access to wireless access point systems at a specified location (such as at work, at home, travel location, or elsewhere), wireless triangulation or distance indicators relative to known access points, or other location indicators. Motion sensor may include accelerometer sensors, gyroscope sensors, orientation sensors relative to reference direction, hall effect sensors, magnetometer, proximity sensors, ambient light sensors, ambient sound sensors such as microphones, infrared motion sensors, temperature sensors, among others. Other types of movement detection sensors may implement any technologies such as infrared-based devices, microwave-based devices, ultrasonic-based devices, tomographic-based devices, digital photography-based devices, and magnetic-based devices, among others The method may continue at block 420 by determining, based on the data received about the wireless utilization parameters, operational user configuration states for data needs of the mobile handling system, time and date based information, and movement or location data from the sensors, an aggregated set of parameters as iterative wireless utilization profile. Once a current iterative wireless utilization profile is determined for a particular time and data, and in some embodiments location, set of factors, the current iterative wireless utilization profile may be transmitted to the wireless utilization machine learning inference modulator.

At block 425, the wireless utilization machine learning inference modulator may receive the current time and date, and in some embodiments location, parameters as part of the reported iterative wireless utilization profile from the aggregator and utilize these factors to search for a previously determined predictive plural wireless control setting index. The wireless utilization machine learning inference modulator may apply the parameter data of current time and date, including time of day, day of the week, month, or year, proximity to scheduled events, and other factors to apply a plurality correlation time and date factors. With correlation of time and date factors within a threshold level, number of correlated factors, or some combination, a previous index correlation engine may determine if a correlation match to a previously defined predictive time and date based plural wireless control setting index may be found in the wireless recommendation history database. The correlation engine may operate to determine one or more patterns of time and date factors, or additionally location factors, that may be used to match with a pattern of wireless utilization in a predictive time period. The correlation engine may utilize a machine learning categorization engine to match the received currently received time and date parameters to match the current iterative wireless utilization profile as correlating with sufficiently similarly defined predictive time period pattern such that selection of a previously defined predictive time and date based plural wireless control setting index as relevant may be made.

According to one or more methods above, the wireless utilization machine learning inference modulator may determine if a matching correlation may be established for a relevant previously defined predictive time and date based plural wireless control setting index entry relative to the currently received iterative wireless utilization profile. If one or more previously defined predictive time and date based plural wireless control setting indices are found to meet a threshold level of correlation, one may be selected with a highest level of correlation in some embodiments. If no previously defined predictive time and date based plural wireless control setting index meets the threshold levels of correlation as determined from the above methods, then flow may proceed to block 440. If a previously defined predictive time and date based plural wireless control setting index is found with sufficient or optimal matching correlation, flow may proceed to block 435.

At block 435, the wireless utilization machine learning inference modulator may download the matching previously defined predictive time and date based plural wireless control setting index from the wireless recommendation history database and adopt it as a baseline. The previously defined predictive time and date based plural wireless control setting index will yield index settings related to operating the one or more wireless network interface modules for a similar, correlated predictive time period having a learned time and date based pattern of factors. With the adopted previously defined predictive time and date based plural wireless control setting index providing baseline wireless setting parameters selected, these may be provided to a machine learning service or a second machine learning service for determination of applicability to current predictive time period wireless utilization settings at 440.

At block 440, the wireless utilization machine learning inference modulator may implement the received wireless utilization profile parameter values as inputs to a machine learning service for correlation to an output layer reflecting plurality of wireless network interface module settings for a predictive time and date based plural wireless control setting index. In some embodiments, if a previously defined predictive time and date based plural wireless control setting index has been adopted as a baseline, the previously defined predictive time and date based plural wireless control setting index may provide additional inputs to the machine learning service related to the plurality of wireless network interface module settings. The wireless utilization machine learning inference modulator in an embodiment may determine such correlations to plurality of wireless network interface module settings in an embodiment based on any machine learning or neural network methodology known in the art or developed in the future.

For example, the wireless utilization machine learning inference modulator in an embodiment may implement a machine learning service, or second machine learning service, depending on usage to correlate time and date parameter patterns as described above, to model the relationships between each of parameters from the iterative wireless utilization profile received, plus any adopted previously defined predictive time and date based plural wireless control setting index, and the predictive time and date based plural wireless control setting index using a layered neural network topology. Such a neural network of the wireless utilization machine learning inference modulator in an embodiment may include a plurality of layers, where each layer includes a plurality of nodes representing metric values or states for each of the parameters, including wireless utilization and wireless performance data, plurality of wireless network interface module settings, time, date, location, or movement related indicators, or user configuration state for data needs parameter data. An input layer to the neural network, for example, may include a known, recorded set of values for each of these parameters from the received iterative wireless utilization profile, plurality of wireless network interface module settings, and any previously define plurality of wireless network interface module settings from an adopted, previously defined predictive time and date based plural wireless control setting index, if any. An output layer to the neural network may include a projected optimal set of values for each of plurality of wireless network interface module settings for a currently-updated, predictive time and date based plural wireless control setting index, based on the known, recorded set of values provided in the input layer.

The wireless utilization machine learning inference modulator in an embodiment may attempt to determine the degree to which each of these parameters in the received iterative wireless utilization profile, plurality of wireless network interface module settings, and any previously define plurality of wireless network interface module settings from an adopted, previously defined predictive time and date based plural wireless control setting index, if any, influence optimal plurality of wireless network interface module settings by assigning preliminary weight matrices to each of the nodes in a given layer. In some embodiments, each assigned weight value in the matrix describes a correlation between at least one of these parameters and at least one of the wireless network interface module settings. The neural network of the wireless utilization machine learning inference modulator may be modeled using any number of layers, and the nodes in each additional layer may be determined based on the value of the nodes in the previous layer and the weight matrices describing correlations between each of the parameters wireless utilization and wireless performance data, time, date, location, or movement related indicators, or user configuration state for data needs parameters. User configuration state for data needs parameters data such as indications of operating software applications and related wireless data connection needs, CPU usage, GPU usage, memory usage, battery usage or power state levels, and plurality of wireless network interface module settings. In other words, each new layer in the neural network may include a plurality of nodes representing a best guess of how each of these parameters from the iterative wireless utilization profile received may affect optimal plural wireless network interface module settings. A greater number of layers within the neural network topology may decrease the likelihood of divergence (yielding unusable results), but may increase processing time. The neural network of the wireless utilization machine learning inference modulator may then produce an output layer including a plurality of nodes, each representing an expected or projected value for each of the learned, custom plural wireless network interface module setting (e.g., enable module, disable module, sleep modes, initialization routines activation, beamsteering enabling, power levels, or the like). The process of generating an output layer, based on a known set of input layer values may be described herein as forward propagation. An initial forward propagation in an embodiment may project optimal learned, custom plural wireless network interface module settings for a single, known set of values for each of these parameters wireless utilization and wireless performance data, plurality of wireless network interface module settings, time, date, location, or movement related indicators, and user configuration state for data needs parameter data.

The wireless utilization machine learning inference modulator in an embodiment may compare the values in the output layer generated in such an initial forward propagation with known, recorded optimal plural wireless network interface settings chosen or accepted by a user as part of a previously defined predictive time and date based plural wireless control setting index for a matching time and date factor correlation given in the input layer of the neural network were recorded. In such a way, the wireless utilization machine learning inference modulator may compare its projected plural wireless network interface settings with actual, known optimal values, and determine a degree of error associated with each projected value (e.g., associated with each node in the output layer of the neural network). The wireless utilization machine learning inference modulator may then use these known error margins to adjust the weight matrices associated with each layer of the modeled neural network. For example, the wireless utilization machine learning inference modulator may perform a back-propagation method to adjust each of the weight matrices in order to more accurately reflect the correlations between each of these parameters from an iterative wireless utilization profile and optimal plural wireless network interface settings.

The wireless utilization machine learning inference modulator in an embodiment may perform this forward propagation and backward propagation, using different input node values repeatedly to finely tune the weight matrices of the wireless utilization machine learning inference modulator such as with repeated iterative wireless utilization profiles as described above. For example, each time a set of parameter data of an iterative wireless utilization profile reflecting software application functional adjustments or user activity adjustments, or the user accepts changes suggested by the wireless utilization machine learning inference modulator based on detected changes to one or more of the parameters, the wireless utilization machine learning inference modulator may forward propagate the wireless usage parameters and other parameters of the iterative wireless utilization profile recorded at that time through the neural network. The wireless utilization machine learning inference modulator may then compare the previously determined predictive time and date based plural wireless control setting index with the iterative wireless utilization profile potentially reflecting adjusted plural wireless network interface settings developed during that forward propagation, and back propagate through the layers of the neural network to adjust the correlated effects that each of these parameters of the data received in the iterative wireless utilization profile has on optimal plural wireless network interface settings. In such a way, the wireless utilization machine learning inference modulator in an embodiment may adaptively learn how changes in these parameters recorded in the iterative wireless utilization profile including wireless usage and performance parameters, operating applications, hardware device usage characteristics, and time, date, schedule, location, and movement characteristics may affect choices of optimal plural wireless network interface settings may have on power consumption.

At block 445, the wireless utilization machine learning inference modulator may determine an updated predictive time and date based plural wireless control setting index pursuant the operation of the machine learning service in an embodiment. The machine learning service may operate, for example, according to one or more embodiments described above or any machine learning classification process. The weight matrices associated with the layers of the neural network model from the wireless utilization machine learning inference modulator in such an embodiment may describe, mathematically, these correlations for wireless usage parameters and user configuration states for data needs related to an individual user during a particular date and time, or even location, identified pattern that may be repeated by the user. The neural network model (including designation of the node values in the input layer, and number of layers), along with the weight matrices associated with each layer in an embodiment may form a predictive time and date based plural wireless control setting index for a recognized time and date pattern that may be repeated for an individual user relative to time of day, days of the week, days of the month, days of the year, or scheduled events, and which may assist in providing plural wireless network interface settings that assist with power usage efficiencies.

Patterns of time and date based factors, which may include various combination embodiments of parameters described herein, may include identified patterns repeated on daily, weekly, monthly, or yearly periods or an intersection of the influences of these repeated patterns with events and trends in a user's wireless utilization of a mobile information handling system with a plurality of wireless network interface modules. Factors of repeated patterns identified may further include patterns due to shifts in schedules caused by scheduled events or events that arise that are not necessarily periodic but may have similarity in trends of wireless utilization such as travel, holidays, work related events, recreational related events, or location related operations. Patterns may also be impacted by shifts due to events that move or vary within a calendar such as meeting or travel schedules, vacations, or holidays such as Passover, Easter, Chinese New Year or the like.

Upon determining the updated predictive time and date based plural wireless control setting index as an output of the machine learning service operations, the wireless utilization machine learning inference modulator may store the update at the wireless recommendation history database 430 as part of a continued training of the model. Such a predictive time and date based plural wireless control setting index for an individual user relating to the identified time and date related pattern may be stored to the wireless recommendation history database 430 for the information handling system or to a cloud-based memory device for access by this mobile information handling system or at a plurality of information handling systems in the future.

By accessing predictive time and date based plural wireless control setting indices for an individual user for a multitude of recognizable patterns of time and date, and even location, based factors, the wireless utilization machine learning inference modulator may provide automatic predictive plural wireless network interface setting adjustments or recommended adjustments that may correlate well with a predictive time period of usage that may arise.

Further, by accessing predictive time and date based plural wireless control setting indices for an individual user via cloud-based memory devices in an embodiment, the individual user may have access to setting adjustments or recommended adjustments at any location where information handling system is currently logged on to operate in accordance with a matching predictive time and date based plural wireless control setting index.

Once the wireless utilization machine learning inference modulator applies a machine learning methodology to determine such correlations in embodiments described herein, the wireless utilization machine learning inference modulator may detect changes to any of these influencing factors and either suggest or automatically apply the predictive time and date based plural wireless control setting index at block 450. For example, changes to one or more of the plural wireless network interface settings controlling one or more of the wireless network interface modules may be suggested to be disabled or be confirmed to remain enabled during an upcoming predictive time period. In other embodiments, such as for a trained set of nodes for a predictive time and date based plural wireless control setting index for an individual user, the predictive wireless network interface setting adjustments may be automatically adjusted for the predictive time period. At this point the method may end, however iterative wireless utilization profiles may continue to cause the process to execute as received in some embodiments. In other embodiments, the system may apply the stored predictive time and date based plural wireless control setting indices for an individual user when new junctures arise of predictive time periods.

Figure 5:
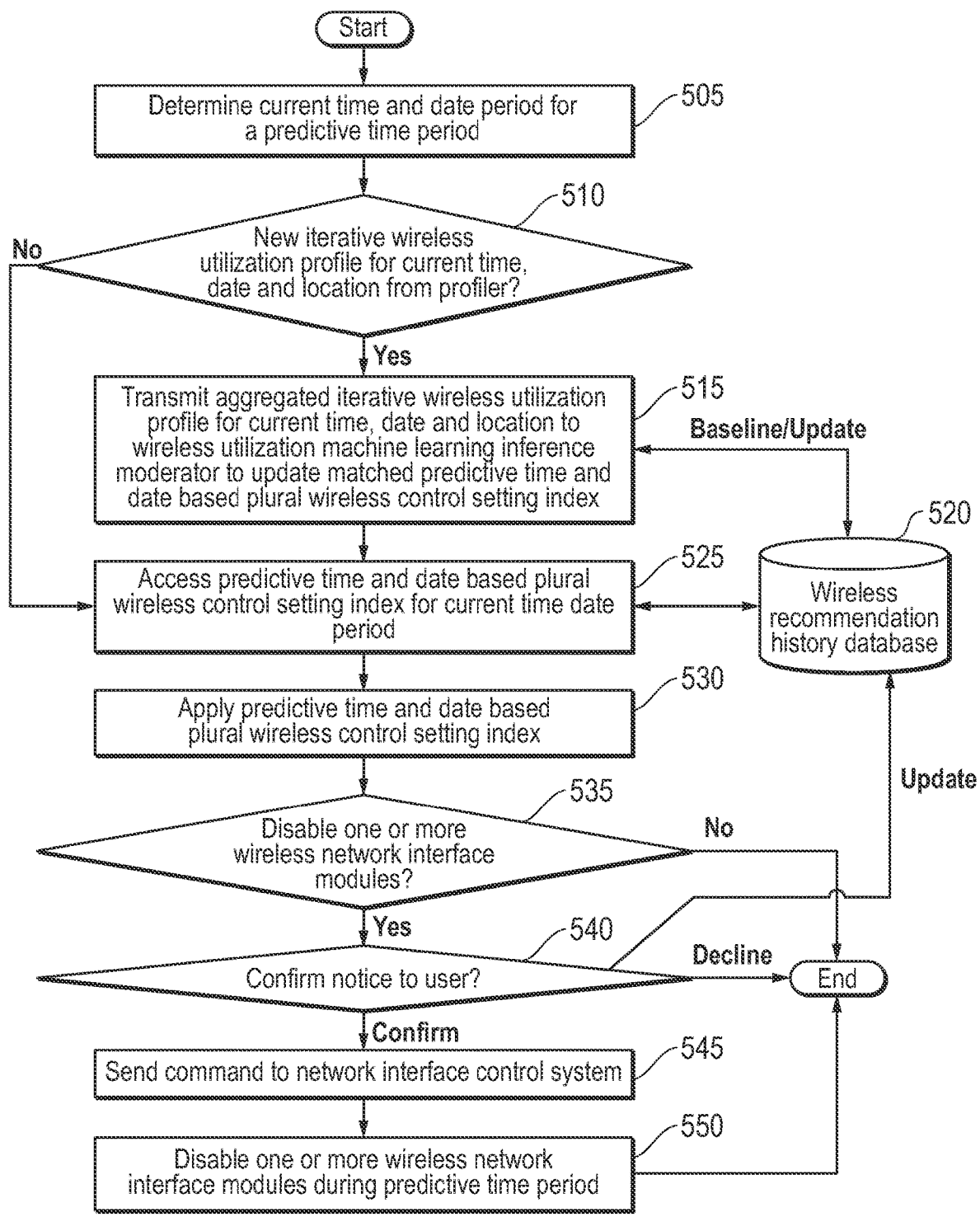
FIG. 5 is a flow diagram illustrating a method of applying machine learning modulation of the performance of a plurality of wireless network interface modules for a mobile information handling system according to an embodiment of the present disclosure.

FIG. 5 is a flow diagram illustrating a method of dynamically or iteratively modulating the performance of a plurality of wireless network interface modules for a mobile information handling system for a predictive time period according to an embodiment of the present disclosure. The method may begin at block 505, where the wireless utilization machine learning inference modulator determines time and date related factors for an impending predictive time period. As described, several factors may be determined including time, relevant time of day, day of the week, day and month of the year, time proximity to scheduled events from a user's calendar and other factors may be determined at 505 for use in correlation matching to identified patterns for time and date based factors that may be associated with potential predictive time and date based plural wireless control setting indices stored at a wireless recommendation history database 520.

Proceeding to 510, the wireless utilization machine learning inference modulator may determine whether a new iterative wireless utilization profile has been received from a profile aggregator as described in embodiments herein. If a new iterative wireless utilization profile has been received at block 510, flow may proceed to block 515 to initiate a machine learning service process to utilize parameter data as described according to embodiments herein from the received iterative utilization profile in an assessment updating or generating new predictive time and date based plural wireless control setting index to update control settings for the plurality of wireless network interface modules that may be deployed on a mobile information handling system. The process of initiating the machine learning service may further include accessing the wireless recommendation history database 520 for a correlation matched previously defined predictive time and date based plural wireless control setting index to use for baseline levels of control settings for the plural wireless network interface modules as part of the machine learning service processing of the iterative wireless utilization profile according to several embodiments herein and described above, for example, with respect to FIG. 5. In another embodiment, the output of the machine learning service of the wireless utilization machine learning inference modulator may provide an updated predictive time and date based plural wireless control setting index for storage in the wireless recommendation history database as described in embodiments herein. Flow may then proceed to block 525 where wireless utilization machine learning inference modulator may utilize the updated predictive time and date based plural wireless control setting index for the current time and date period of a predictive time period of wireless utilization on the mobile information handling system.

If no new iterative wireless utilization profile has been received at block 510 or the predictive time and date based plural wireless control setting index for the impending predictive time period has been updated pursuant to block 515 and the machine service embodiments described herein, flow may proceed to block 525 to utilize the predictive time and date based plural wireless control setting index for the current time and date period of a predictive time period. Where the machine learning service has already generated a new predictive time and date based plural wireless control setting index or conducted correlated matching for the current time and date period of a predictive time period to update the predictive time and date based plural wireless control setting index at 515, the current predictive time and date based plural wireless control setting index may be known and provided at block 515. If no new iterative wireless utilization profile was received at block 510, then to access previously determined predictive time and date based plural wireless control setting indices stored at wireless recommendation history database 520, a correlated matching of the current time and date based pattern that may be pertinent to the impeding predictive time period of wireless utilization must be conducted. The correlated matching may be conducted with threshold correlation parameters or via application of a machine learning service classifier by the wireless utilization machine learning inference modulator according to various embodiments herein. With a correlated match pursuant to one or a plurality of time, date, schedule or location parameters in various embodiments and meeting threshold levels of correlation or pursuant to time and date based parameters or correlation via a machine learning classifier engine as described in embodiments above, a previously determined predictive time and date based plural wireless control setting index may be selected from the wireless recommendation history database.

Proceeding to block 530, the wireless utilization machine learning inference modulator may apply the selected predictive time and date based plural wireless control setting index to determine control settings for the plural wireless network interface modules of the information handling system during the impending predictive time period for wireless system utilization.

The wireless utilization machine learning inference modulator may determine at block 535 in an example embodiment whether one or more wireless network interface modules are to be disabled in an example embodiment. In other embodiments, one or more control settings for control of the plural wireless interface modules may include various adjustments to set modules as enabled, disabled, cause some modules to enter one or more sleep modes that may save power, allow or limit initialization routines for module activation and seeking wireless link initiation, enable or limit beamsteering operations in 5G protocols or other protocols, determine any limits that may apply to transmission power levels, or the like. If no changes to the plural wireless network interface module control settings similar to the above example embodiments are recommended, the method may end. If changes to the plural wireless network interface module control settings similar to the above example embodiments are recommended at block 535, the method proceed in an optional embodiment to block 540.

In an example optional embodiment at block 540, the wireless utilization machine learning inference modulator in an embodiment may notify the user of suggested predictive adjustments to one or more wireless network interface modules. The wireless utilization machine learning inference modulator may provide a graphical user interface seeking confirmation or a user's selection to decline the recommended predicted adjustments. In embodiments in which the user chooses to confirm application of suggested predictive adjustments to one or more wireless interface module control settings, flow may proceed to block 540 for the wireless utilization machine learning inference modulator to transmit the predictive adjustments to plural wireless interface control settings to the network interface control system to make those changes. The wireless utilization machine learning inference modulator may update the wireless recommendation history database with the user's decision to confirm. In embodiments where a user elects to decline the suggested predictive adjustments to one or more wireless interface module control settings, the wireless utilization machine learning inference modulator may update the predictive time and date based plural wireless control setting index entry of the wireless recommendation history database. Such a user decision may be implemented as part of the machine learning service inputs for refining the determination of the predictive time and date based plural wireless control setting index entries.

In other embodiments, the wireless utilization machine learning inference modulator may automatically apply such predictive adjustments to the plural wireless network interface modules without suggesting them to the user. This may be true after a sufficient training period or a sufficient number of training iterations have occurred with the machine learning service models of the predictive time and date based plural wireless control setting indices has occurred. In embodiments which the wireless utilization machine learning inference modulator automatically applies such changes without suggesting them to the user, flow may skip block 540 and the wireless utilization machine learning inference modulator may transmit the selection of predictive time and date based plural wireless control setting index for application to the network interface control system as in block 545.

In yet other embodiments, the wireless utilization machine learning inference modulator may automatically apply such predictive adjustments to the plural wireless network interface modules and notify the user of the changes made allowing the user an option to not accept the predictive adjustments via a user interface. With notification and request for an option to decline and undo the changes after the automatic application of such predictive adjustments to the plural wireless network interface modules, the decision to decline or not decline with a non-response may be similarly sent to update the predictive time and date based plural wireless control setting index entry of the wireless recommendation history database. Again, such a user decision may be implemented as part of the machine learning service inputs for refining the determination of the predictive time and date based plural wireless control setting index entries.

At block 545, the wireless utilization machine learning inference modulator may send the predictive time and date based plural wireless control setting index to the network interface control system for execution of predictive adjustments to the plural wireless network interface module control settings. These predictive adjustments to the plural wireless network interface module control settings may be similar to the above example embodiments such as setting modules as enabled or disabled, causing some modules to enter one or more sleep modes that may save power, allowing or limiting initialization routines for module activation and seeking wireless link initiation in one or more interface modules, enable or limit beamsteering operations in 5G protocols or other protocols, determine any limits that may apply to transmission power levels for power savings related to low bandwidth utilization wireless links, or the like.

For example, by determining for time and data based set of factors that a particular day and time may correlate to a matched pattern of day and time factors, and in some embodiments other factors such as location, the wireless utilization machine learning inference modulator may determine that the date and time detected correlate to a meeting, individual work time, travel time, recreational time, or other time having identifiable patterns and with repetition of wireless utilization among the plurality of wireless network interface modules. For example, the wireless utilization machine learning inference modulator might determine that a user on Mondays at 8 to 9 am, is usually located in the specified executive conference room, in a recurrent meeting as gleaned from his calendar), has a certain business integration dashboard application always running, and is usually also on a video conference. Accordingly, the business integration application and video conference are always given priority and connected to the 5G mm-wave access point for such a meeting. Given that scenario, in the future, given this past behavior at these times, places and circumstances, the 5G wireless network interface is kept up while other network interfaces, like WLAN, Wi-Fi and BT are opportunistically disabled or put in low-power modes, since those are not likely to be used.

At block 550, the network interface control system may apply the above settings to each modified wireless network interface module of the mobile information handling system. For example, one or more wireless interface module that are predicted to remain unused may be disabled or set into any available sleep mode during the predictive time period. At this point the process may end.

The blocks of the flow diagrams of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A mobile information handling system comprising:
a processor, a memory, a power management system, and a plurality of wireless network interface modules for wireless connection to a plurality of wireless networks;
a wireless network interface control system for controlling the plurality of wireless network interface modules;
the processor executing instructions of a wireless utilization machine learning inference modulator to receive iterative wireless utilization profiles indicating aggregated time and location profiles of wireless network utilization parameters and the performance of each of the plurality wireless network interface modules; and
a sensor to receive input descriptive of the environment and location of the mobile information handling system for inclusion in the iterative wireless utilization profiles;
the processor reporting user configuration states for data needs including applications operating, and processing, port, battery, and memory hardware usage levels for inclusion in the iterative wireless utilization profiles;
the wireless utilization machine learning inference modulator to, upon execution of a machine learning process, determine a predictive time and date based plural wireless control setting index for adjusting control settings of the plural wireless network interface modules based on information associated with the received iterative wireless utilization profiles and updating the predictive time and date based plural wireless control setting index to a wireless recommendation history database; and the wireless network interface control system accessing the predictive time and date based plural wireless control setting index correlating to a current calendar day, time and location to disable or leave enabled each of the plurality of wireless network interface modules.

2. The mobile information handling system of claim 1, wherein the wireless utilization machine learning inference modulator to, upon execution of a machine learning process, determine a predictive time and date based plural wireless control setting index for adjusting the performance of the wireless network interface modules further based on a previously-determined predictive time and date based plural wireless control setting index from the wireless recommendation history database of time and date based plural wireless control settings corresponding to the time, day and location of the received iteration of the wireless utilization profiles.

3. The mobile information handling system of claim 1, wherein the wireless network interface control module accessing the updated predictive time and date based plural wireless control setting index correlating to a current calendar, day, time and location disables a subset of the plurality wireless interface modules predicted to not be used.

4. The mobile information handling system of claim 1, wherein the plurality wireless interface modules comprises:
a WiFi wireless interface module;
a 5G LTE wireless interface module; and
a Bluetooth wireless interface module.

5. The mobile information handling system of claim 1, where the received wireless utilization profiles includes reported available wireless networks corresponding with the plurality of wireless interface modules at the time and day of the received iterative wireless utilization profile.

6. The mobile information handling system of claim 1, where the received iterative wireless utilization profiles indicating aggregated time and location profiles of wireless network utilization parameters, the performance of each of the plurality wireless network interface modules, and user configuration states for data needs includes reported current battery power states at the time and day of the received iterative wireless utilization profile.

7. The mobile information handling system of claim 1, where the received iterative wireless utilization profiles indicating aggregated time and location profiles of wireless network utilization parameters, the performance of each of the plurality wireless network interface modules, and user configuration states for data needs includes reported wireless signal quality and bandwidth levels corresponding with the plurality of wireless interface modules at the time and day of the received iterative wireless utilization profile.

8. A mobile information handling system comprising:
a processor, a memory, a power management system, and a plurality of wireless network interface modules for wireless connection to a plurality of wireless networks;
a wireless network interface control system for controlling the plurality of wireless network interface modules;
the processor executing instructions of a wireless utilization machine learning inference modulator to receive wireless utilization profiles indicating aggregated time and location profiles of wireless network utilization parameters and the performance of each of the plurality wireless network interface modules; and a sensor to receive input descriptive of the environment and location of the mobile information handling system for inclusion in the wireless utilization profiles;
the processor reporting user configuration states for data needs including applications operating, and processing, port, battery, and memory hardware usage levels for inclusion in the iterative wireless utilization profiles;
the wireless utilization machine learning inference modulator to, upon execution of a machine learning process via the processor, determine a predictive time and date based plural wireless control setting index for adjusting control settings of the plural wireless network interface modules based on information associated with the received wireless utilization profiles and user configuration states for data needs; and
the wireless network interface control system accessing the predictive time and date based plural wireless control setting index correlating to a current calendar day, time and location to disable or leave enabled each of the plurality of wireless network interface modules.

9. The mobile information handling system of claim 8, wherein the wireless utilization machine learning inference modulator determines a predictive time and date based plural wireless control setting index for adjusting the performance of the wireless network interface modules further based on a previously-determined predictive time and date based plural wireless control setting index from s wireless recommendation history database of time and date based plural wireless control settings corresponding to the time, day and location of the received iteration of the wireless utilization profiles.

10. The mobile information handling system of claim 8, wherein the wireless network interface control module accessing the predictive time and date based plural wireless control setting index correlating to a current calendar, day, time and location disables a subset of the plurality wireless interface modules predicted to not be used.

11. The mobile information handling system of claim 8, wherein the plurality wireless interface modules comprises:
a WiFi wireless interface module;
a 5G LTE wireless interface module; and
a Bluetooth wireless interface module.

12. The mobile information handling system of claim 8, wherein the plurality wireless interface modules comprises:
a WiFi wireless interface module; and
a plurality of 5G LTE wireless interface modules.

13. The mobile information handling system of claim 8, where the received wireless utilization profiles includes reported available wireless networks corresponding with the plurality of wireless interface modules at the time and day of the received iterative wireless utilization profile.

14. The mobile information handling system of claim 8, where the reported user configuration states for data needs includes reported current battery power states at the time and day of the received wireless utilization profile.

15. The mobile information handling system of claim 8, where the performance of each of the plurality wireless network interface modules includes reported wireless signal quality and bandwidth levels corresponding with the plurality of wireless interface modules at the time and day of the received wireless utilization profile.

16. A mobile information handling system comprising:
a processor, a memory, a power management system, and a plurality of wireless network interface modules for wireless connection to a plurality of wireless networks;

a wireless network interface control system for controlling the plurality of wireless network interface modules;

the processor executing instructions of a wireless utilization machine learning inference modulator to receive time and date based parameter data factors relating to time of day, day of the week, day of the month, day of the year, and time proximity to scheduled events of a user;

the wireless utilization machine learning inference modulator to apply a machine learning classification algorithm to match correlation of learned patterns in the time and date based parameter data factors of an impending predictive time period of wireless system utilization and select a matching previously determined predictive time and date based plural wireless control setting index for predictively adjusting the control settings of the plurality of wireless network interface modules during the impending predictive time period of wireless system utilization; and the wireless utilization machine learning inference modulator accessing the matched predictive time and date based plural wireless control setting index correlating to a current calendar day, time and location of the impending predictive time period to suggest to the user, via a graphical user interface, predictive adjustments to modify control settings of a subset of the plurality of wireless network interface modules to reduce energy consumption.

17. The mobile information handling system of claim 16, further comprising:

a network interface control system to receive predictive adjustments to modify control settings of a subset of the plurality of wireless network interface modules to reduce energy consumption when a user confirms the suggested predictive adjustments to modify control settings of the subset of the plurality of wireless network interface modules; and the network interface control system to disable the subset of the plurality of wireless network interface modules.

18. The mobile information handling system of claim 16, wherein the wireless utilization machine learning inference modulator updates the predictive time and date based plural wireless control setting index at a wireless recommendation history database with data indicating a user's response of confirmation or denial of the suggested predictive adjustments to modify control settings of the subset of the plurality of wireless network interface modules.

19. The mobile information handling system of claim 16, wherein the predictive time and date based plural wireless control setting index stored at a wireless recommendation history database is determined based on a machine learning service conducting repeated training via received iterative wireless utilization profiles indicating aggregated time and location profiles of wireless network utilization parameters, and user configuration states of the mobile information handling system for data needs during matched correlation to time and date learned patterns in the time and date based parameter data factors.

20. The mobile information handling system of claim 16, wherein the plurality wireless interface modules comprises:

a WiFi wireless interface module; and a plurality of 5G LTE wireless interface modules.

* * * * *